Oct. 14, 1958

V. E. MATULAITIS 2,856,565

ELECTRICAL DISCHARGE MACHINING

Filed Dec. 24, 1956

INVENTOR.
Victor E. Matulaitis
BY M. K. Murphy
ATTORNEY.

United States Patent Office 2,856,565
Patented Oct. 14, 1958

2,856,565

ELECTRICAL DISCHARGE MACHINING

Victor E. Matulaitis, Franklin, Mich., assignor to Elox Corporation of Michigan, Royal Oak, Mich.

Application December 24, 1956, Serial No. 630,124

2 Claims. (Cl. 315—207)

This invention relates to an improved power supply for electrical-discharge-machining apparatus.

It is the primary object of my invention to provide a simplified arc machining apparatus and electrical circuit therefor which substantially improves stability of operation of the apparatus, particularly during machining at high rates of stock removal.

Another object is to provide, in connection with E. D. M. apparatus, accurately predetermined, substantially identical, uni-directional current pulses from an alternating current power source.

Still another object is to provide means for creating uni-directional current pulses of preselected magnitude, controllable at the will of the machine operator between limits of substantially zero current and maximum output of the generating source, from an A. C. power source.

Other objects and advantages will be apparent from the following specification and illustration of preferred forms of my invention.

Figure 1:
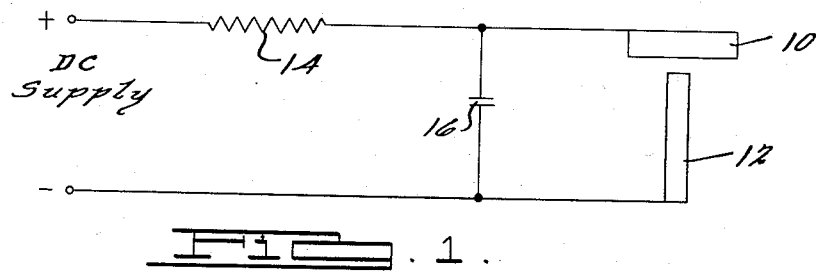
Figure 2:
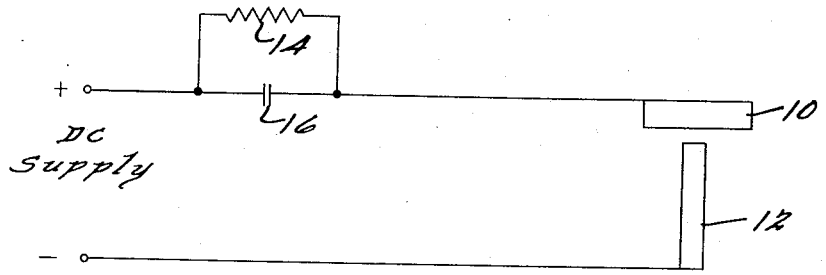
Figure 3:
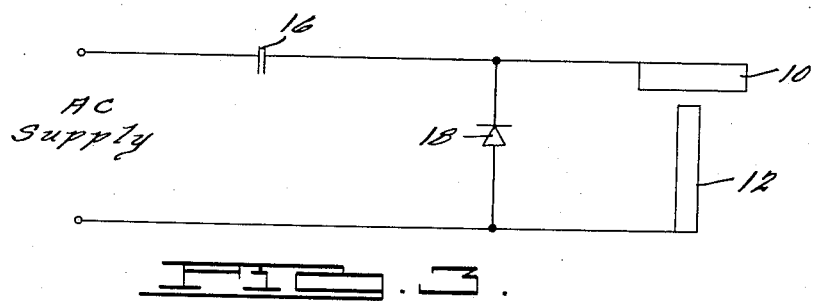
Figure 4:
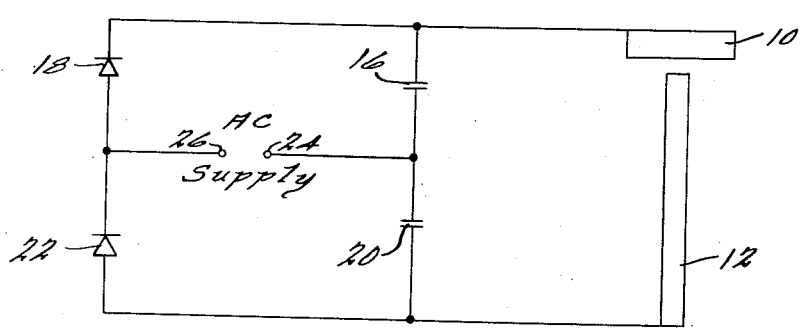

In the drawings accompanying the specification, in which reference characters have been used to designate like parts referred to herein, Fig. 1 is a schematic circuit diagram of a basic E. D. M. circuit;

Fig. 2 is a schematic circuit diagram of an optional basic E. D. M. circuit;

Fig. 3 is a schematic circuit diagram of an improved E. D. M. circuit incorporating my invention; and Fig. 4 is a modified circuit also incorporating my invention.

While the circuit of Fig. 1 is well known in the electrical-discharge-machining art, reference to it will serve to clarify operation of my improved circuits. The Fig. 1 circuit is subject to a basic limitation in that the current delivered to the gap between the electrode and workpiece is relatively low so far as present day demands are concerned.

In the basic circuit, a workpiece 10 is connected to the positive side of a D. C. supply through a coupling resistor 14. The electrode 12 is connected to the negative side of the circuit and a capacitance 16 is connected across the gap. Proper adjustment of the parameters of the circuit and proper spacing of the electrode and workpiece will produce periodic electrical discharges of short duration as are necessary for electrical-discharge machining. It will be understood that the gap is flooded with coolant which may be circulated by a suitable pump as is common in E. D. M. apparatus.

It is desirable to pass the highest possible current through the gap to secure a fast cutting rate, but lowering of the ohmic value of resistor 14 to achieve faster cutting results in an increase in the duration of some of the individual discharges with the result that the operation becomes unstable and burning of the machined surface of the workpiece occurs which renders the piece liable to be scrapped because of poor surface finish.

In the Fig. 2 circuit, the resistor 14 is shunted across the condenser 16. This circuit is sometimes used in low power E. D. M. apparatus but is even more limited than the Fig. 1 circuit in its ability to handle large amounts of power because the condenser discharge current must flow through the power source thus the dynamic impedance of the power supply tends to prolong the duration of the condenser discharges, and the lengths of the leads carrying the condenser discharge current must be relatively long therefore adding inductance to the circuit with attendant loss of abruptness of discharge of condenser 16.

The Fig. 3 circuit is a simplified circuit embodying my improvement. In this circuit, the power supply is alternating current, preferably of high frequency such as is obtained from a high frequency motor-driven generator or a vacuum tube oscillator. The condenser 16 is series connected in one side of the line and the gap between the workpiece 10 and the electrode 12 is bridged by a rectifier 18. The latter may be of the dry element type or of the vacuum tube type as preferred or as dictated by the power demands of the apparatus.

This circuit operates as follows:

Assuming that proper adjustment of the parameters has been made, when the instantaneous voltage of the A. C. power supply is such as to make the potential of workpiece 10 positive with respect to electrode 12, this voltage will appear across the arc-gap because rectifier 18 is in "blocking" relation and will pass substantially no current. When the difference of potential across the gap reaches sufficient magnitude, the gap will fire and current will flow from the power supply, through condenser 16, across the gap and back to the supply.

It will be noted that the total energy of this discharge is a function of the power capability of the A. C. power supply and the physical capacity of condenser 16 or, in other words, assuming a power supply of substantially unlimited capability, the power delivered to the gap during any single discharge is limited only by the capacity of condenser 16.

After a discharge across the gap, a voltage difference exists across condenser 16 and subsequent gap discharges will not occur until this voltage is eliminated or reduced to a low value. In the Fig. 2 circuit, this necessary reduction in charge leaks off through resistor 14. In the Fig. 3 circuit, the necessary discharging of condenser 16 occurs when the A. C. voltage swings such that the instantaneous voltage of workpiece 10 would tend to become negative with respect to the electrode 12. However, the presence of rectifier 18 in the circuit prevents occurrence of a potential difference across the gap under these conditions because the power supply is practically short-circuited through the rectifier and condenser. Thus the condenser 16 is charged in a reverse direction and the circuit is readied for another gap discharge when the A. C. voltage swings in the other direction.

The Fig. 3 circuit is especially well adapted for use with electrical discharge machining apparatus having automatic electrode feed, because substantially no current is drawn by or delivered by the condenser until or unless the electrode is in firing relation with respect to the workpiece.

Attention is now directed to Fig. 4 which shows schematically an alternate form of circuit. This circuit resembles the well known "voltage doubling" circuit, but it will be seen that the circuit as used herein is novel in that it accomplishes in a simple and novel manner the following three things so desirable in an E. D. M. circuit:

(1) Periodic pulses of unidirectional power are delivered from an alternating current source.

(2) The gap is completely isolated from the A. C. power supply so far as direct current flow is concerned thus eliminating possibility of a sustained arc which would damage the workpiece.

(3) The condenser may be disposed very close to the gap (like in Fig. 1) so that the inductance of the leads is negligible.

As will be seen from the diagram, A. C. terminal 26 is connected between rectifiers 18 and 22 and A. C. terminal 24 is connected between the condensers 16 and 20, the two rectifiers being connected in series and connected across the series connected condensers, both in turn being connected across the gap between the electrode 12 and workpiece 10.

In operation, when terminal 26 is positive with respect to reference terminal 24, condenser 16 is charged in such manner that the side of the condenser connected to workpiece 10 is positive. In like manner when terminal 26 is negative, condenser 20 is charged such that the side connected to electrode 12 is negative. Thus, the rectifiers 18 and 22 function to alternately charge the condensers 16 and 20 in accordance with the reversals of voltage of the A. C. supply.

One outstanding advantage of the Fig. 4 circuit is that the leads from the condensers to the electrode and workpiece can be made very short and the consequent reduction in inductance makes possible extremely rapid discharging of condensers 16 and 20, which in turn increases the power pulses per second delivered across the gap with consequent increase in the machining rate.

I claim:

1. In an electrical-discharge-machining system for cutting metallic workpieces by means of intermittent discharge across a gap between an electrode and a workpiece, means for supplying to said gap intermittent unidirectional power pulses from an A. C. power supply comprising a condenser connected in series with the gap and a rectifier connected in parallel with the gap whereby the flow of A. C. current will be through the rectifier when the current flows in one direction and across the gap when the current flows in the opposite direction.

2. The combination of claim 1 wherein the gap is fired only when the flow of current is such that the electrode is of negative polarity.

References Cited in the file of this patent

UNITED STATES PATENTS

| | | |
|---|---|---|
| 1,998,107 | Vrooman | Apr. 16, 1935 |
| 2,134,439 | Dorgelo | Oct. 25, 1938 |
| 2,235,385 | Rava | Mar. 18, 1941 |
| 2,298,956 | Mason | Oct. 13, 1942 |
| 2,310,092 | Knowles et al. | Feb. 2, 1943 |
| 2,628,330 | Williams | Feb. 10, 1953 |
| 2,756,316 | Teubner | July 24, 1956 |
| 2,785,279 | Williams | Mar. 12, 1957 |